United States Patent [19]

Imondi et al.

[11] Patent Number: 5,274,743
[45] Date of Patent: Dec. 28, 1993

[54] LEARNING SYSTEM FOR A NEURAL NET OF A SUITABLE ARCHITECTURE, PHYSICALLY INSERTABLE IN THE LEARNING PROCESS

[75] Inventors: Giuliano Imondi; Giulio Marotta; Giulio Porrovecchio, all of Rieti; Giuseppe Savarese, Naples, all of Italy

[73] Assignee: Texas Instruments Incorporated, Dallas, Tex.

[21] Appl. No.: 828,062

[22] Filed: Jan. 30, 1992

[30] Foreign Application Priority Data

Jan. 31, 1991 [IT] Italy .................. RM 91 A000077

[51] Int. Cl.⁵ .............................................. G06F 15/46
[52] U.S. Cl. ........................................ 395/23; 395/22; 395/24
[58] Field of Search ............... 395/22, 23, 24, 3, 97

[56] References Cited

U.S. PATENT DOCUMENTS

| | | | |
|---|---|---|---|
| 4,866,645 | 9/1989 | Lish | 395/24 |
| 5,021,988 | 6/1991 | Mashiko | 395/24 |
| 5,039,871 | 8/1991 | Engeler | 395/24 |
| 5,040,215 | 8/1991 | Amano et al. | 395/22 |
| 5,140,531 | 8/1992 | Engeler | 395/24 |
| 5,146,542 | 9/1992 | Engeler | 395/24 |
| 5,150,450 | 9/1992 | Swenson et al. | 395/24 |
| 5,155,802 | 10/1992 | Mueller et al. | 395/24 |

*Primary Examiner*—Michael R. Fleming
*Assistant Examiner*—Tariq R. Hafiz
*Attorney, Agent, or Firm*—William E. Hiller; Richard L. Donaldson

[57] ABSTRACT

The subject of the invention is a learning system for a neural net physically insertable in the learning process, which comprises a detecting member for presenting to said neural net the basic information set that said neural net has to learn in order to provide a desired response; a microprocessor suitable to iteratively execute a learning algorithm based on a comparison among said basic information set itself, the response that the neural net provides and the response that one wants to obtain from the neural net (see FIG. 1).

8 Claims, 2 Drawing Sheets

LEARNING SYSTEM FOR A NEURAL NET OF A SUITABLE ARCHITECTURE, PHYSICALLY INSERTABLE IN THE LEARNING PROCESS

The present invention generally relates to those electronic circuits that are named neural nets because of their functional likeness to the tridimensional physiologic structures of the cerebral neurons and more particularly it is concerned, from a first point of view, with a particular architecture that allows a so to say self-adaptive neural net to be implemented, i.e. a neural net that is able to insert itself directly in the learning process, and, from a second point of view, with the overall learning system.

As is known, the ordinary processors comprise two fundamental blocks, a computing unit and a memory unit to which the computing unit accesses to sequentially execute its functions. Therefore, a fundamental line of the development of computers is, naturally, that of increasing the computing power thereof and one can go along such a line only through an increase of the computing speed, and thus through an increase of the number of operations executable in a unit time.

At a certain moment the ascertainment has taken place that, at least under certain circumstances, it is not suitable to execute one operation at a time, though in a very short time, and computer architectures have been conceived capable of operating, that is to say to execute operations, in parallel. The basis of such architectures is the concept of the sharing of the computing power and the storing capacity in a plurality of smaller computing and storing units capable of communicating with each other.

At the extreme limit of the concept of the sharing and of the parallelism in the processing of information, there is the human brain. The studies on the brain have ascertained that it has an extremely interconnected structure, in the sense that it consists of an awful lot of nerve cells (neurons), each of which has its own intrinsic computing power and storing capacity, that interact with each other through particular regions named synapses. The result of this organization with respect to a standard processor is that a standard processor turns out to be certainly superior to a human brain from the point of view of the execution of single arithmetic and logic operations, as it is able to execute them in an extremely faster way, but it shows itself decisely inferior when the execution of more complex tasks, such as the recognition of characters, images or sounds, is dealt with. It is just in these fields that neural nets have found their first examples of application.

Indeed, though one hasn't precisely comprehended the mechanisms, it has been ascertained that an artificial neural net, simulated through software or actually implemented by assembling a number of neural elementary "cells", qualitatively behaves as a natural brain, in the sense that, inter alia, it is able to recognize characters, though in a certain way disformed or lacunose, it doesn't sense for instance the loss of some neurons or the malfunction of the same; all, probably, by virtue of the high redundance degree that is realized in such nets.

The present electronic technics in practice doesn't allow neural nets to be realized, having more than a certain number of neurons or more than a certain number of synapses, that are the elements that connect the neurons, in which resides their storing capacity.

Therefore, the main object of the present invention is to suggest a new general architecture that makes it more feasible to integrate a great number of neurons in a chip and that at the same time faces and solves other problems no longer associated with the practical implementation of a neural net, but associated with the setting up of the same for the practical operation of the same: meaning thereby to refere in particular to the "learning" stage of the neural net.

Indeed, a neural net, as any natural brain, is initially inert and isn't able to perform any tasks, as a not programmed electronic computer, on the other hand. Therefore, it is to be subjected to a learning stage, in which it organize itself to perform the function that has been given it.

When the synapses have been realized according to the teachings of the co-pending patent application No. RM 91 A000075 of the same Applicant hereof, that have an input for a voltage for weighting the synapse, the learning process consists in determining and storing suitable voltage values to be applied to the weighting inputs of all the synapses associated with the single neural nuclei of the net.

The learning stage of a neural net can be assimilated to a subsequent approximations process in which, through a suitable iteratively executed algorithm, the stored voltages for weighting the synapses take the suitable values little by little in order that the net then provides the desired responses in the application stage, such as in the character recognition.

Therefore, three classes of problems are to be solved to achieve the general object mentioned above.

First of all, it is necessary to minimise the number of the components that must form part of the neural net, in order to keep the complexity and the physical size of the chip at a minimum. An architecture can contribute to this end, in which the operations that aren't necessary to the application are outside the chip, the latter being thus set free from as much functions as possible and keeping the merely neural functions strictly necessary to the application, as for instance the recognition of characters, only.

A second problem connected in a sense with the preceding one, is that, once the chip has been reduced to the minimum number of components and all the not strictly necessary operations have been extracted from it and transferred to the microprocessor that executes the algorithm for programming the synapses, of minimising the number of the connections with such a processor that is to supply data to all the net, so as to reduce the number of its pins to a minimum and thus minimise its cost and encumbrance.

A third problem relates to the fact that, as is well known, the number is restricted of the re-programmings which the non-volatile memory cells, such as that of the $E^2PROM$ which are used to hold the variable resistance values of the synapses in the absence of the power supply, can be subjected to. Therefore, taking into account the fact that the learning process is a subsequent approximations process in which the "weight" of each synapse is modified hundreds times to fetch more and more correct values little by little, until all the net converges to the computed values, if EEPROM memory cells are used, there is an actual risk that, at least in certain instances, the maximum number is exceeded or, at least, that such cells cannot be subjected to other learning sequences after having been used in an application. This is a serious restriction of all the neural nets, for which one hasn't found any remedies before the present invention.

In the preferred embodiment, a neural net that fulfills the requisites mentioned above, having n inputs and n outputs, physically insertable in the learning process, comprises a set of n neurons with their n×n synapses arranged in an array of j rows and i columns (i, j=0, 1, ..., n), each neuron being comprised of an operational amplifier. The synapses are comprised of a differential stage and have a voltage input ($V_{IN}$) terminal, a current output ($I_{OUT}$) terminal and a terminal for inputting the weighting voltage ($V_W$). The voltage input terminals of all the synapses of a column are connected together and form the n inputs of the neural net. The output terminals of all the synapses of a row are connected together and form the inputs of one of said n neurons; a capacitor is connected between the ground and the terminal for inputting the weighting of each synapse to store the voltage applied to the synapse itself; moreover, said neural net comprises a RAM memory that digitally stores the values of the voltages for weighting all the synapses, as well as a series of n digital-to-analogue converters (DAC), one for each column and having their respective outputs connected to the terminals for weighting all the synapses of said column by means of one electronic switch for each synapse, the electronic switches being driven by n bistable circuits (FF), one for each row; a control section being also provided, that drives all said bistable circuits and provides operation commands and data for said RAM memory.

Again in the preferred embodiment, an EEPROM memory is provided, associateable with said RAM memory to store the values of the voltages for weighting all the synapses in a non-volatile and digital way.

Naturally, such a non-volatile memory can be realized in the same chip as the neural net, but nothing prevents it from being realized on an autonomous chip outside the neural chip.

In the preferred embodiment, the learning system of the present invention is a system that comprises a detecting member for presenting to said neural net the set of the basic information that the neural net has to learn to provide a desired response; a microprocessor suitable to iteratively execute a learning algorithm based upon the comparison among said basic information set itself presented to the neural net, the response that the neural net gives it and the response that one desires to obtain from the neural net itself; said microprocessor being, therefore, connected to the neural net, on a side, and to said detecting member, on the other side, through an analogue multiplexer and an analogue-to-digital (A/D) converter, as its main components.

Further characteristics and advantages of the present invention will become apparent by the following disclosure with reference to the annexed drawings in which the preferred embodiment is represented in an illustrative and not limiting way, and in which:

DESCRIPTION OF THE ILLUSTRATIVE EMBODIMENTS

With reference now to the figures, the system of the present invention will be described with reference to a neural net in a 64-input and 64-output implementation, the latter being, however, understood to be an implementation example that hasn't any limiting characters.

Figure 1:
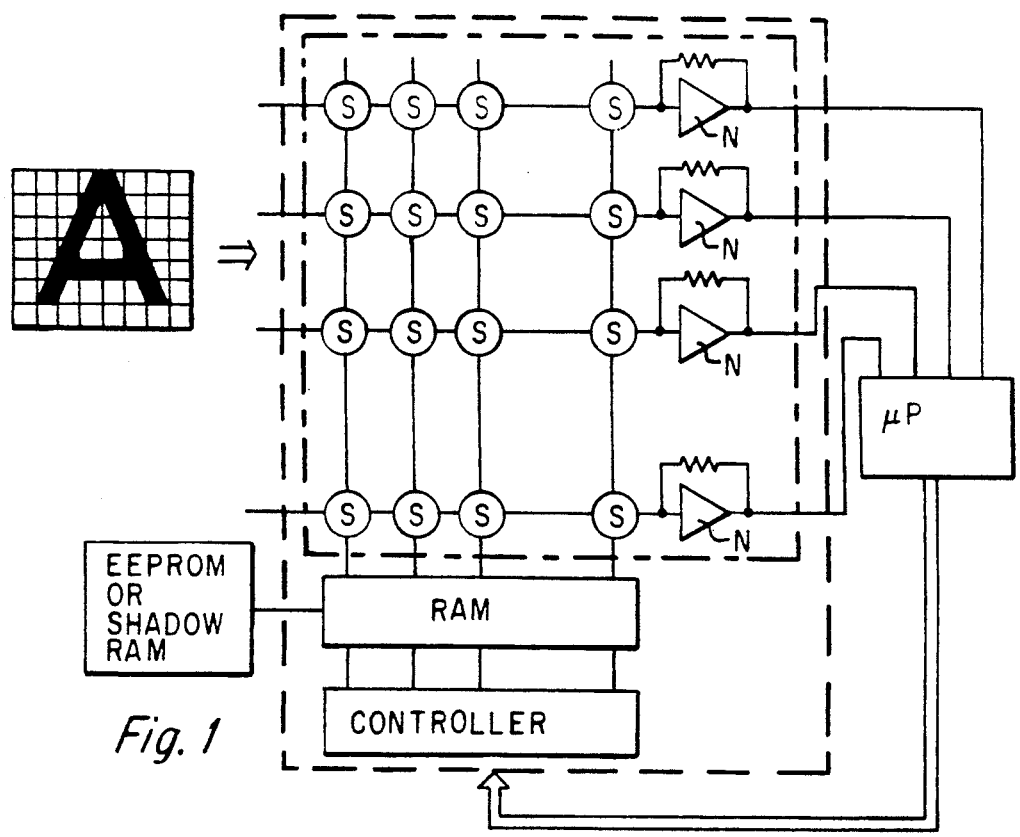
FIG. 1 very schematically and representatively shows the relationship between one of a series of characters, a neural processor according to the present invention and a learning microprocessor (algorithm)

A neural processor is shown in FIG. 1, the neurons of which are comprised of operational amplifiers N and the synapses of which basically comprise a differential stage realized with MOS transistors, the structural and operational features of which can be deduced from the abovementioned copending patent application of the same Applicant hereof. It is to be recalled only that such a synapse has a current output, depending in magnitude and in sense on the difference between an input voltage $V_{IN}$ and a weighting voltage $V_W$ which represents the "weight" of the synapse.

Such a processor, which is illustrated in a one-level implementation, but which can be implemented with two or more levels, comprises 64 neurons with their associated 64×64 synapses for each level.

Supposing that such a processor has to carry out a character recognition, it is to be first of all subjected to a learning process during which it must store information relevant to the characters that it will have to recognize subsequently. This learning process involves that all the characters are presented to it the one after the other, in the case of FIG. 1 the letter A in a matrix of 8×8 pixels, and that through a suitable algorithm executed on a development or learning microprocessor ($\mu$P) the voltages for weighting the different synapses are modified by subsequent approximations through the iteration of the algorithm until the values of all the voltages converge to the values that allow the neural processor to provide the desired response.

FIG. 1 wants to outline in an apparent way the solution that the present invention has given to the first problem mentioned in the introductory part, that is to say the problem of simplifying the chip of the neural processor. in FIG. 1, indeed, it is seen that the chip comprising the neural processor basically comprises the neurons, the synapses, the RAM memory containing the digital values of the voltages for weighting all the synapses and an EEPROM memory for copying the weight values of the synapses defined and stored in the RAM memory during the learning process in a non-volatile way only, while the microprocessor with the algorithm is completely detached and independent.

As an obvious specification, it is to be put into evidence that the EEPROM memory is of use only to store the voltages stored in the RAM memory in a non-volatile way, such that it can be realized on the same chip or on a separate chip associateable with the neural chip, or it can be realized as a so-called "shadow memory" (shadow RAM).

Numerous advantages accrue from this first feature, the first of which is that the number of the components that form part of the neural net is restricted to the strictly indispensable ones, which contributes to simplify the structure of the chip and to reduce its size or, the sizes being equal, to increase the number of the neurons contained in it. The simplification is also associated with the fact that the so realized chip executes the operations indispensable for the recognition only, the learning ones being divided between the chip and the learning microprocessor (algorithm).

Moreover, the distinct division between the neural chip and the learning processor allows the learning process that one wants to execute to be varied at will, thereby increasing the versatility and the flexibility of the system.

Figure 4:
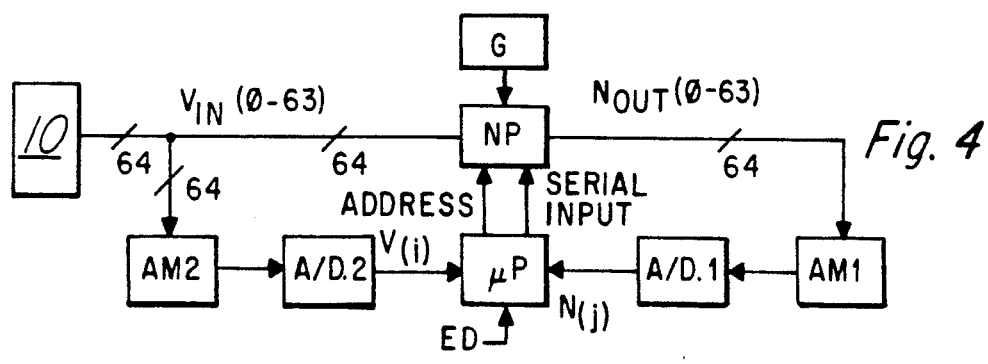
FIG. 4 shows a block diagram of a neural processor inserted in a learning system according to the present invention.

With reference now to FIG. 4 a block diagram is seen of the overall learning system for a neural processor for the character recognition, which is naturally is a temporary part of the system, as it will be inserted in the practical application or, if desired, it will be employed in other development and study processes after the learning stage.

Again considering the learning of characters divided into 64 pixels, the scanner 10 performs a subsequent scanning of the single characters and applies the 64 bits on the input of the neural processor NP, realized with one or more levels, as in FIG. 1. Based upon possibly null random values of the voltages for weighting the synapses or rather if these voltages are preliminarly adjusted at values intermediate between the minimum and maximum ones, the neural net will process the received information and provide a 64-bit output. The 64 outputs of the neural processor NP through an analogue multiplexer AM1 that serializes them and an analogue-to-digital converter A/D.1 that digitizes them, are applied to a microprocessor $\mu P$ in which the algorithm for correcting the values of the voltages for weighting the synapses of the neural net is executed.

To this end, the microprocessor $\mu P$ also receives a further input which specifies which is the response that is intended to be obtained from the neural processor in correspondence of the single characters that the processor has to recognize: such a further input is indicated in FIG. 4 with ED (Expected Data). Moreover, again by means of an analogue multiplexer AM2 and of an analogue-to-digital converter A/D.2, the learning microprocessor $\mu P$ receives the same information that the scanner applies to the neural processor. In this way, it is able to estimate the effect that the processing of a portion of the neural net has caused in such input information.

The output of the microprocessor $\mu P$ returns to the neural net NP to modify the values of the voltages for weighting the synapses contained in it, as it will be seen now.

Premising that the correction of the values of the voltages for weighting the synapses can be carried out a character at a time, the one after the other, but it has been ascertained that it is advantageous to scan all the characters of the set first, then to make the corrections to values of said voltages, the update, i.e. the actual correction of the values of the voltages for weighting the synapses of the entire neural net is performed once the scanner has scanned all the characters of the set and thus the microprocessor $\mu P$ has computed and accumulated all the corrections to be made.

Figure 3:
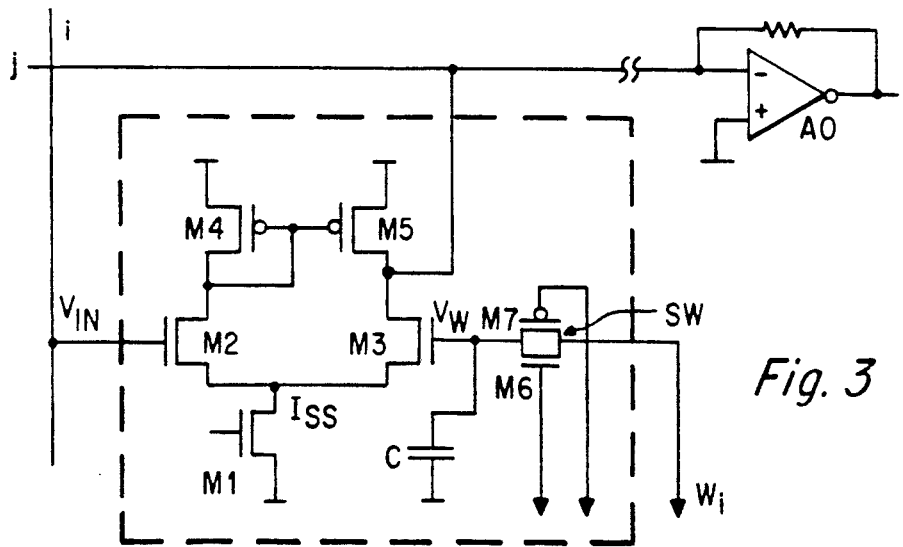
FIG. 3 shows a detail diagram of a synapse.

With reference now to FIG. 3, a neuron is put into evidence with its synapse (dashed square) and precisely the neuron j and the synapse inserted between the input line i and the neuron j with i, j=0, 1, 2, ..., 63 to form the entire neural net.

As is seen in the figure, the neuron consists of an operational amplifier A0 and the synapse comprises a circuit with MOS transistors connected as a differential stage containing a first transistor M1 operating as a current generator $I_{SS}$, in which two branches in parallel end, the first of which includes a transistor M2 to the gate region of which the input voltage $V_{IN}$ is applied and having a transistor M4 with a P channel in series, connected as a diode, and the second of which comprises a transistor M3 that we shall be able to define for weighting because to its gate region the weighting voltage $V_W$ is applied, that sets the "weight" of the synapse. In this second branch a P-channel transistor M5 is connected in series to the transistor M3. The two P-MOS transistors M4 and M5 have their gate regions short-circuited. The output of this differential stage, drawn on the node N between the two transistors M3 and M5, is a current that can have a value between $-I_{SS}$ and $+I_{SS}$. The weighting voltage $V_W$ is applied to the transistor M3 by the line W through a switch SW realized by means of a pair of MOS transistors, with an N channel and a P channel respectively, M6 and M7, driven by a bistable, not shown in this figure, as will be seen below; such a weighting voltage $V_W$ is stored on the capacitor C inserted between the gate region of the weighting transistor M3 and the ground.

For further details of this synapse, reference can be made to the abovementioned co-pending patent application.

Figure 2:
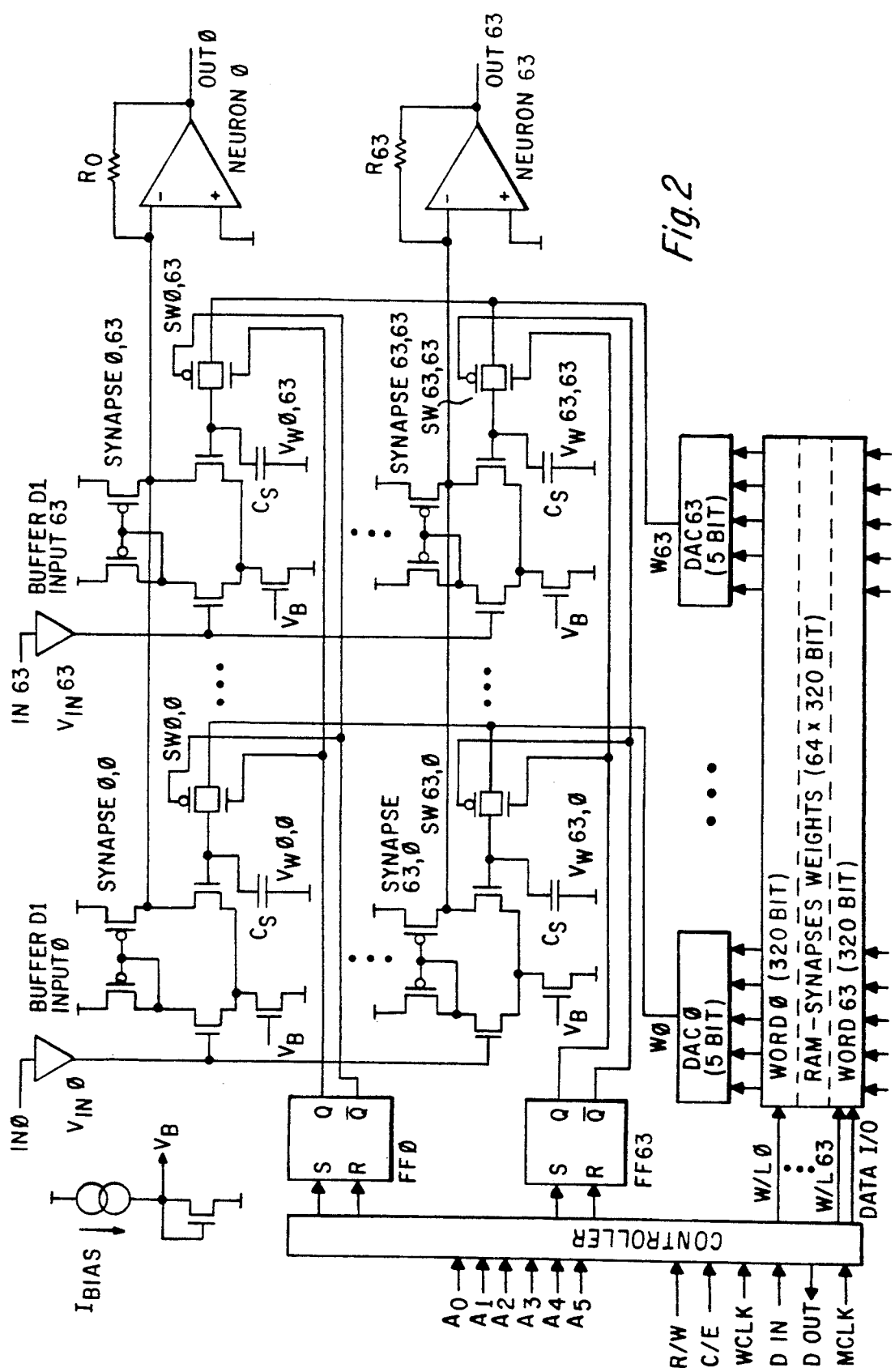
FIG. 2 shows an assembly diagram of a neural processor according to the present invention.

As regards the whole neural net, reference can be made to FIG. 2 which, on the basis of the application of the recognition of characters, as a matter of example comprises 64 neurons (NEURON j with J=0, 1, 2, ..., 63) and therefore 64 input lines for applicating 64 input voltages $V_{INi}$ (i=0, 1, 2, ..., 63) and 64 outputs OUTj. Such a net therefore comprises 4096 synapses $S_{ij}$ arranged in an array of 64 rows j and 64 columns i, between each input line and each neuron. Therefore 4096 capacitors $C_S$ are provided to singly store the 4096 weighting voltages $V_{Wij}$ applied through as many switches $SW_{ij}$ through 64 weighting lines $W_i$. Each weighting line $W_i$ reaches all the switches of a coloumn i. The 64 weighting lines end in a memory RAM through as many digital-to-analogue converters $DAC_i$.

Supposing, as a matter of example only, that it is desired to annex weights selectable among 32 possible levels to the synapses $S_{ij}$ and that the set of such weights is to be stored in said RAM memory, then it will be necessary that such a memory has a structure comprising 64 words, i.e. one word for each neuron j, and each word will have to consist of $64 \times 5 = 320$ bit, 64 being the number of weighting lines $W_i$ and 5 being the number of the bit necessary for determining the 32 possible different levels of weight of the synapses $S_{ij}$.

As each weighting line $W_i$ is connected to all the synapses of a column i through the switches $SW_{ij}$, in order to apply a given weighting voltage $V_W$ to a synapse of the column i, e.g. the synapse $S_{il}$, all the switches of the column i are to be closed, with the exception of the switch associated with said synapse, i.e. the switch $SW_{il}$. As is seen in FIG. 2, all the switches SW of a row j are driven by a bistable $FF_j$; precisely, it is seen that said switches in a known manner comprise a push-pull connected N-channel MOS transistor and a P-channel MOS transistor having the gate region of the N-MOS transistor connected to the pin $\overline{Q}$ and the gate region of the transistor N-MOS connected to the pin Q of said bistables $FF_j$.

A control section is provided to complete the circuit, which control section not only provides all the read-/write, addressing and data input/output commands for the RAM memory, but all the Set/Reset for all the 64 bistables FF$_j$, on which the state of opening/closing of all the switches SW depends, too.

In practice, therefore, the control section, which per se is a simple design component for those skilled in the art, scans all the synapses of the net and at the same time drives the RAM memory so as to send the respective weighting voltage to all the synapse, the one after the other. Such voltage is stored on the capacitor C$_S$ and the stored value is thus iteratively "refreshed" to compensate for the unavoidable leakages that would unduly modify the weight of the synapse in a short time.

Naturally, from the dimensional point of view, the refresh frequency must be greater than the decay time of the charge accumulated on the capacitors.

Since, as already mentioned, the learning process consists of an undetermined number of iterations of the algorithm and of subsequently more and more approximate corrections, the solution of the present invention also solves the problem of the limitation of the number of re-write cycles which a non-volatile memory can be subjected to. Indeed, it is seen that the learning process of the present invention is completely executed on a structure such as that of FIG. 2, which includes a RAM memory. At the end of the process, said RAM memory will have stored all the values of the voltages for weighting the synapses that are suitable to the desired application. The copying of the contents of the RAM memory in a non-volatile EEPROM memory, which can be built in the same chip, or can be contained in an independent chip, is provided as the last virtual operation of the learning process for the non-volatile holding of such values.

In the operating stage, naturally, supposing that owing to a power supply interruption the RAM memory has lost its contents, one will proceed, as before, transferring the data from the EEPROM memory to the RAM memory, which will provide for the sending to each capacitor C$_S$, through the necessary converter DAC, of the value of the voltage that belongs to the relevant synapse.

A further advantage of a so realized structure consists in the fact that the possibility of selecting the weighting voltage among 32 levels as in the previously described illustrative embodiment, gives such a weighting voltage a practically analogue character, which can be further improved without difficulties, if desired, by raising the selectivity to 64 levels, by simply raising from 5 to 6 the number of the bits associated with each synapse and therefore by utilizing 6-bit converters DAC instead of 5-bit ones. At the memory level the complication is very banal, since in any case a total number of bits is dealt with which is very exiguous and very lower than the capacity of the presently available memories.

It is further desired to put into evidence that, independently of the applications, of the memory types, and of other possible disclosed features, the principles of the present invention can be implemented with different combinations of components (RAM, SRAM, DRAM, EEPROM, FLASH EEPROM, SHADOW RAM) easily determined by those skilled in the art and adaptable to the different use conditions.

Therefore, in the above only the embodiment of the present invention that presently is the preferred one has been disclosed, but it is to be understood that, besides the modification and the alternatives already set forth, those skilled in the art will be able to make variations and changes, without so departing from the scope of protection of the enclosed claims.

We claim:

1. A learning system for developing data to be incorporated into a neural network processor, wherein the neural network processor is connected into the learning system for receiving a basic set of data provided by the learning system during the learning process, said learning system comprising:
   detector means for establishing an initial set of basic data from which the learning process is to begin;
   a neural network processor having an array of rows and columns providing synapses and subject to the learning process, said neural network processor being connected to the output of said detector means for receiving the initial set of basic data therefrom;
   a microprocessor having a memory provided with a learning program, the output of said microprocessor being connected to an input of said neural network processor;
   the output of said neural network processor being connected to a first input of said microprocessor;
   a first analog multiplexer interconnected between the output of said neural network processor and said first input of said microprocessor;
   a first analog-digital converter connected between the output of said first analog multiplexer and said first input of said microprocessor;
   a second analog multiplexer interconnected between the output of said detector means and a second input of said microprocessor;
   a second analog-digital converter connected between the output of said second analog multiplexer and said second input of said microprocessor;
   a source of data indicative of the intended response to be obtained from said neural network processor, said data source being connected to a third input of said microprocessor; and
   said microprocessor iteratively executing the learning process via the learning program provided by the memory of said microprocessor in response to a comparison between the initial set of basic data as received by said neural network processor from said detector means, the output of said neural network processor as provided to said first input of said microprocessor, and the intended response to be obtained from said neural network processor from said data source connected to said third input of said microprocessor.

2. A learning system as set forth in claim 1, wherein said neural network processor has a character recognition function for recognizing a character included in a plurality of characters;
   said detector means comprising a scanner for scanning an array of a plurality of pixels indicative of one of the plurality of characters to be recognized and providing a plurality of bits indicative of the scanned character as the initial set of basic data to said neural network processor in the learning process.

3. A learning system as set forth in claim 1, wherein said neural network processor comprises a plurality of $n \times n$ synapses arranged in an array of j rows and i columns;
   a plurality of operational amplifiers respectively corresponding to the plurality of rows and defining a set of n neurons;
   each of said synapses having a terminal for inputting a weighting voltage thereto;

a random access memory for digitally storing voltage values for weighting all of the synapses;

a plurality of digital-analog converters, one for each column of said array of synapses, said digital-analog converters being connected to said random access memory for converting the digital voltage values for weighting the synapses into analog voltage values, the respective outputs of said digital-analog converters being connected to the weighting terminals of said synapses of a respective column;

an electronic switch disposed in the connection between the weighting terminal of a respective synapse included in said column and the digital-analog converter corresponding thereto;

a plurality of bistable circuits, one for each row of said array, and respectively connected to said electronic switches for each of said synapses included in a row for driving said electronic switches; and control means operably connected to said plurality of bistable circuits and to said random access memory for driving said bistable circuits and providing commands and data for said random access memory.

4. A learning system as set forth in claim 3, further including non-volatile memory means connected to said random access memory for storing the digital values of the voltages for weighting said plurality of synapses provided in said random access memory as a backup to said random access memory when the iterative execution of the learning process by said microprocessor has ended.

5. A learning system as set forth in claim 4, wherein said non-volatile memory means is provided on the same chip as said neural network processor.

6. A learning system as set forth in claim 4, wherein said non-volatile memory means is provided on a separate chip from the chip on which said neural network processor is provided.

7. A learning process for developing data to be incorporated into a neural network processor having memory storage for a plurality of data values, said learning process comprising the steps of:

providing an initial set of basic data to the neural network processor;

operating on the initial set of basic data as provided to the neural network processor in accordance with a learning program;

providing an output from said neural network processor corresponding to the initial set of basic data provided to said neural network processor;

providing a source of data indicative of the intended response to be obtained from said neural network processor;

comparing the initial set of basic data, the output from said neural network processor corresponding to the initial set of basic data as received thereby, and the data from said data source indicative of the intended response to be obtained from said neural network processor in an iterative procedure;

producing comparative results in response to the comparison of the initial set of basic data as received by said neural network processor, the output from said neural network processor corresponding to the initial set of basic data provided thereto, and the data from the data source indicative of the intended response to be obtained from said neural network processor for each iteration of the iterative procedure;

directing the comparative results to said neural network processor as part of the iterative procedure; and up-grading data values in the memory storage of said neural network processor in response to the receipt by said neural network processor of the comparative results during the iterative procedure.

8. A learning process as set forth in claim 7, wherein said neural network processor performs optical character recognition, the initial set of basic data provided to said neural network processor being obtained by scanning an array of a plurality of pixels indicative of a character from a group of characters to be recognized by the neural network processor;

producing an output as a plurality of bits representative of the character to be recognized in response to the scanning of the pixel array; and providing the plurality of bits to the neural network processor.

* * * * *